United States Patent
Babayeva et al.

(10) Patent No.: US 11,171,802 B2
(45) Date of Patent: Nov. 9, 2021

(54) SOCIAL NETWORK ONBOARDING

(71) Applicant: Facebook, Inc., Menlo Park, CA (US)

(72) Inventors: Anna Babayeva, Menlo Park, CA (US); Molly Duffy, Menlo Park, CA (US); Elizabeth Johnson, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/591,390

(22) Filed: Oct. 2, 2019

(65) Prior Publication Data

US 2021/0105242 A1 Apr. 8, 2021

(51) Int. Cl.
*H04L 12/28* (2006.01)
*H04L 12/58* (2006.01)
*H04L 29/08* (2006.01)
*H04L 29/06* (2006.01)

(52) U.S. Cl.
CPC .......... *H04L 12/2825* (2013.01); *H04L 51/32* (2013.01); *H04L 67/26* (2013.01); *H04L 67/306* (2013.01); *H04L 67/34* (2013.01); *H04L 12/2818* (2013.01); *H04L 63/101* (2013.01); *H04L 67/303* (2013.01); *H04L 69/24* (2013.01)

(58) Field of Classification Search
CPC ............... H04L 12/2825; H04L 63/101; H04L 12/2818; H04L 67/34; H04L 67/303; H04L 51/32
See application file for complete search history.

(56) References Cited

U.S. PATENT DOCUMENTS

| 9,269,081 | B1 | 2/2016 | Panzer | |
|---|---|---|---|---|
| 2010/0333019 | A1 | 12/2010 | Oschwald et al. | |
| 2012/0227035 | A1* | 9/2012 | Obasanjo | H04L 67/34 717/176 |
| 2013/0275039 | A1* | 10/2013 | Sathish | G01C 21/3667 701/409 |
| 2020/0233388 | A1* | 7/2020 | Pognant | H04L 12/2825 |

OTHER PUBLICATIONS

European Search Report for Application No. 20197769.1 dated Nov. 4, 2020, 8 pages.

(Continued)

*Primary Examiner* — Kyung H Shin
(74) *Attorney, Agent, or Firm* — Lee & Hayes, P.C.

(57) ABSTRACT

Techniques are described that determine a user to participate in software testing of a social network application and/or service and to enable the user to propagate an invitation to contacts of the user to participate in the software testing of the social network application. In some examples, the user may be provided a message via an inbox of a first service including the invitation and a selectable option to install an application associated with a second service. In some, examples, the user may be sent a list of contacts from which the user may select other users to also participate in the software testing of the social network application. In some examples, responsive to the user's selection, a message may be sent to an inbox of the selected contacts that contains an invitation to participate in the beta version of the social network application.

20 Claims, 9 Drawing Sheets

(56) References Cited

OTHER PUBLICATIONS

Anonymous, "How Do I Stop Facebook from Suggesting I Download the Messenger App?" Facebook Help Community, Dec. 31, 2016, XP055743184, printed Oct. 23, 2020, https://www.facebook.com/help/community/question/?id=10153447435142470, 1 page.

Anonymous, "Please Stop Ruining Mobile Browsing Experience: redesign," Feb. 6, 2019, XP055743003, printed Oct. 22, 2020, https://www.reddit.com/r/redesign/comments/anp2kv/please_stop_ruining_mobile_browsing_experience/, 2 pages.

* cited by examiner

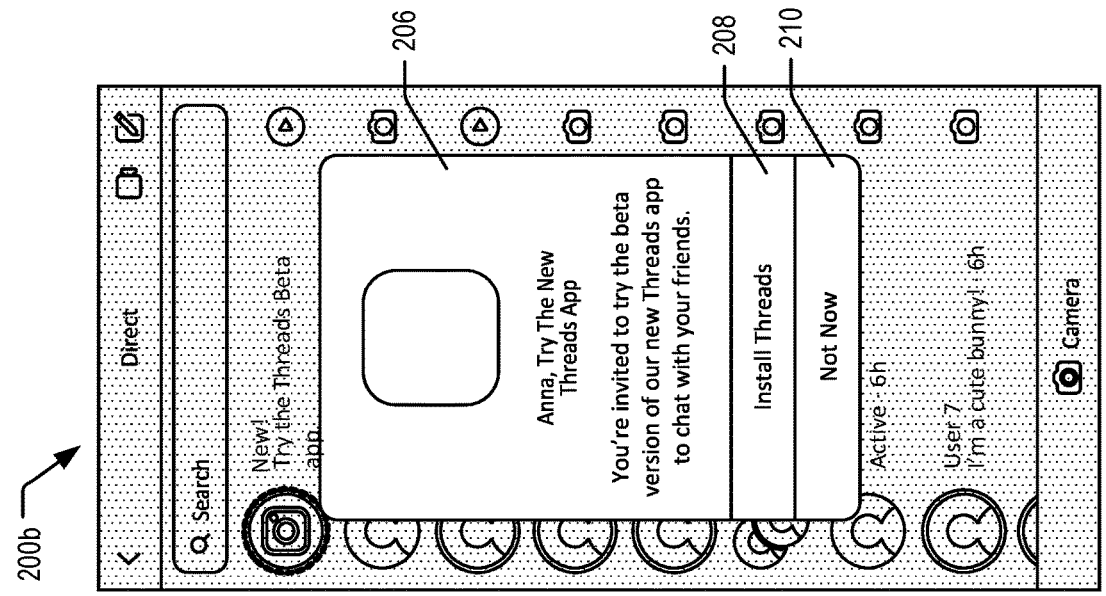
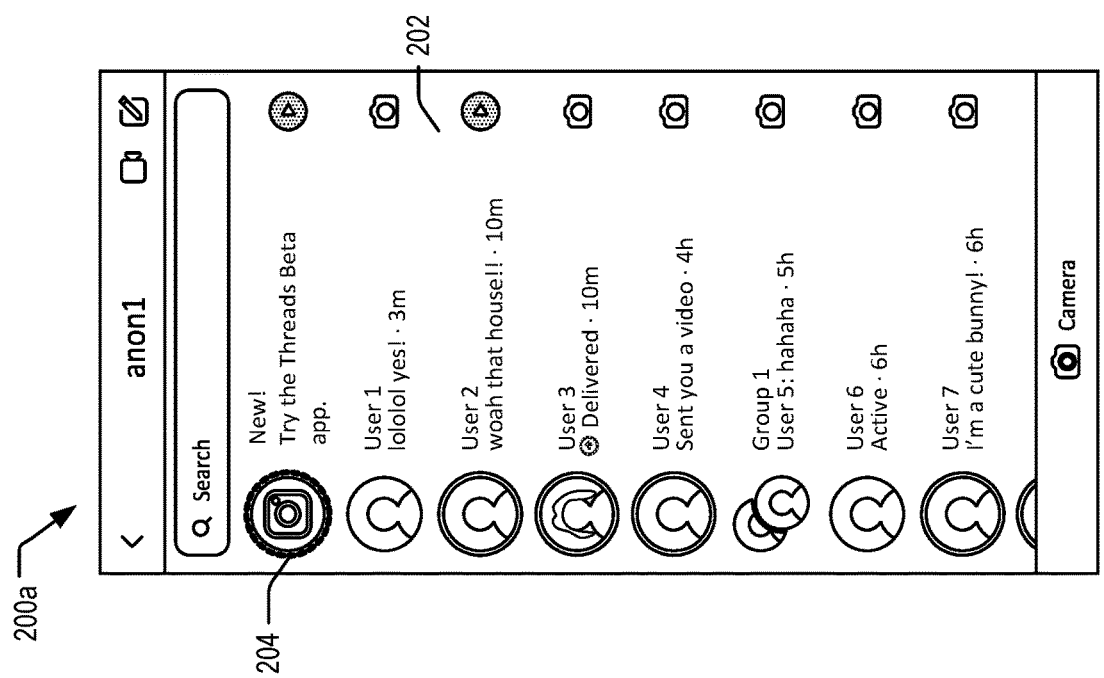
FIG. 2B
FIG. 2A

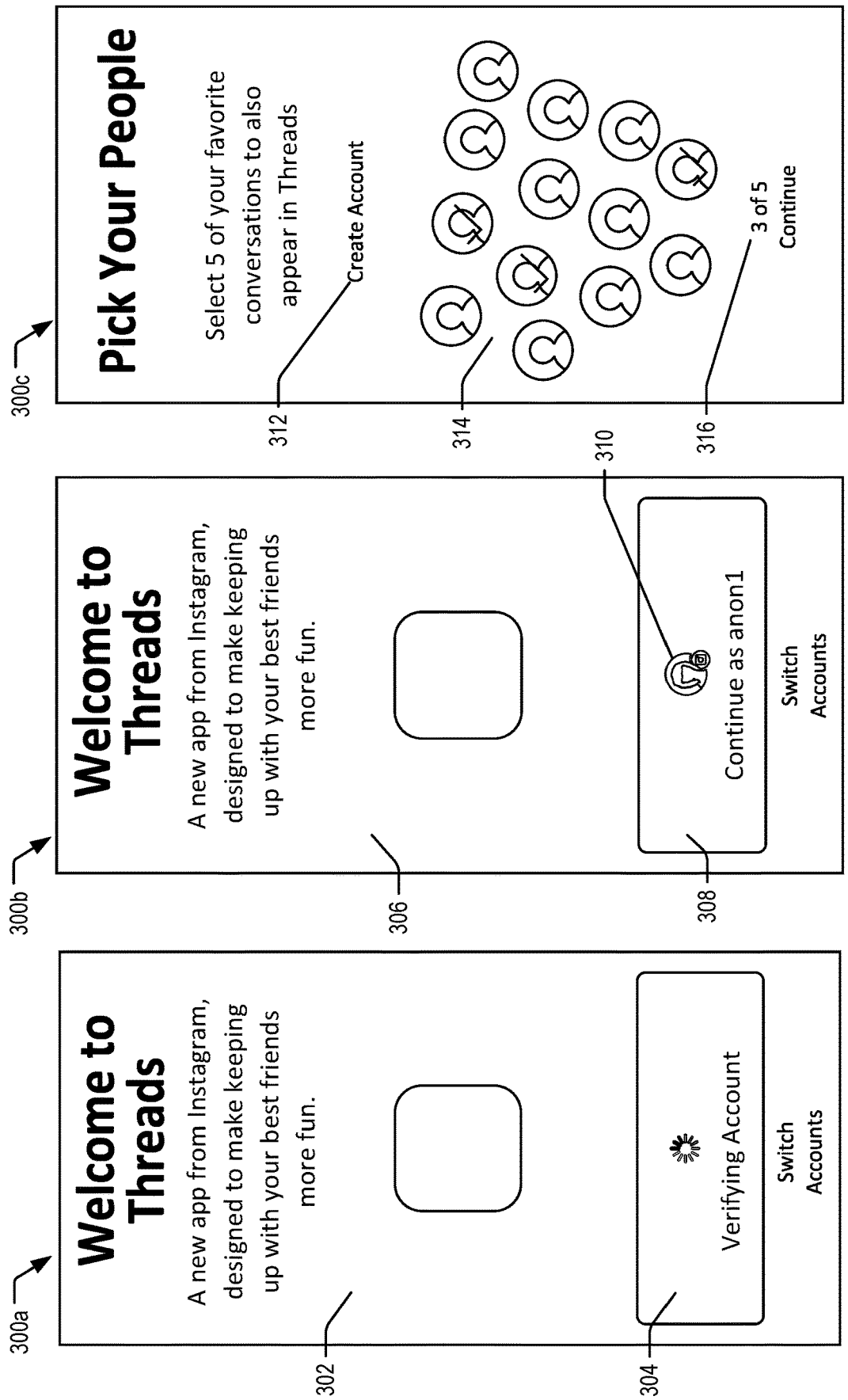

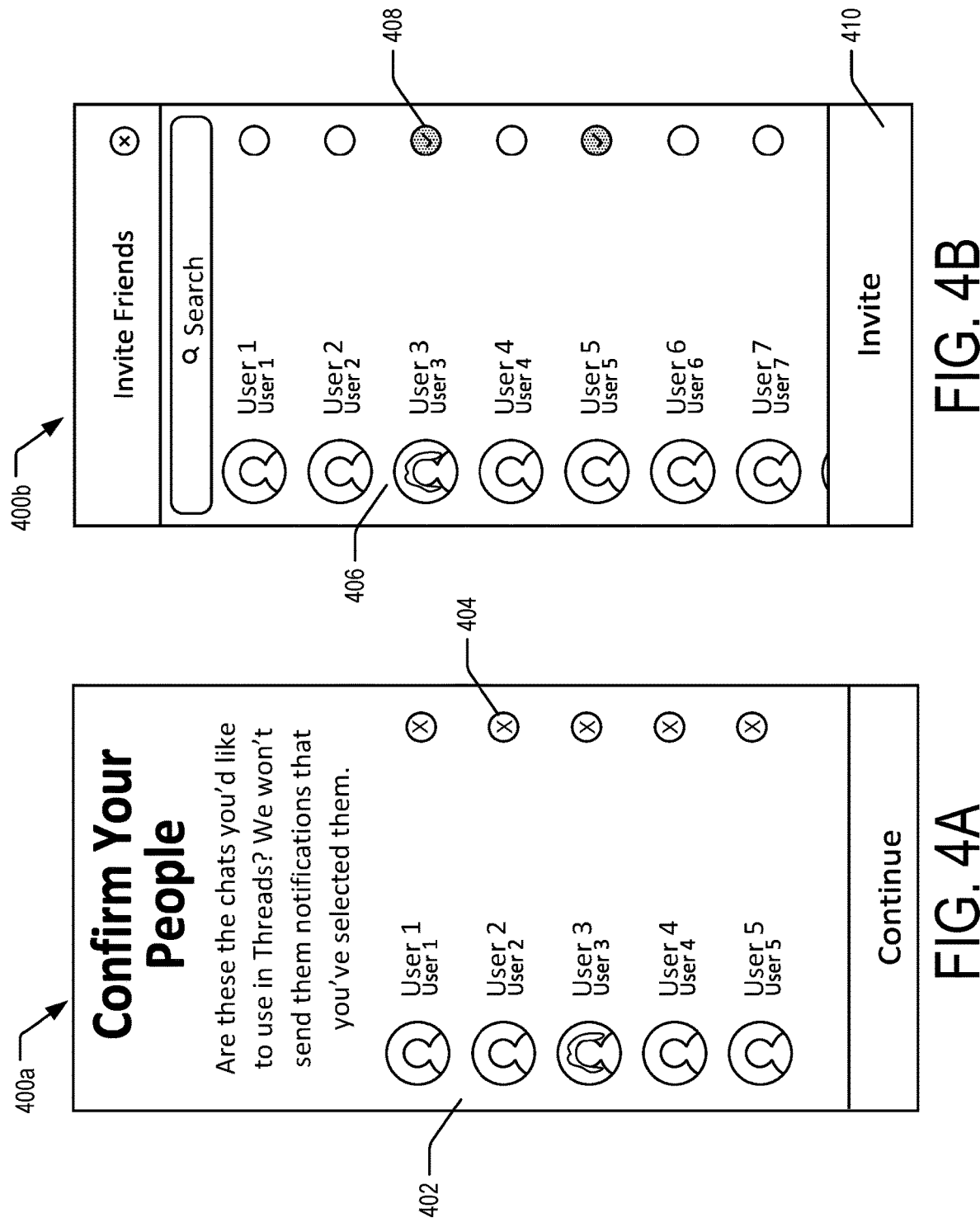

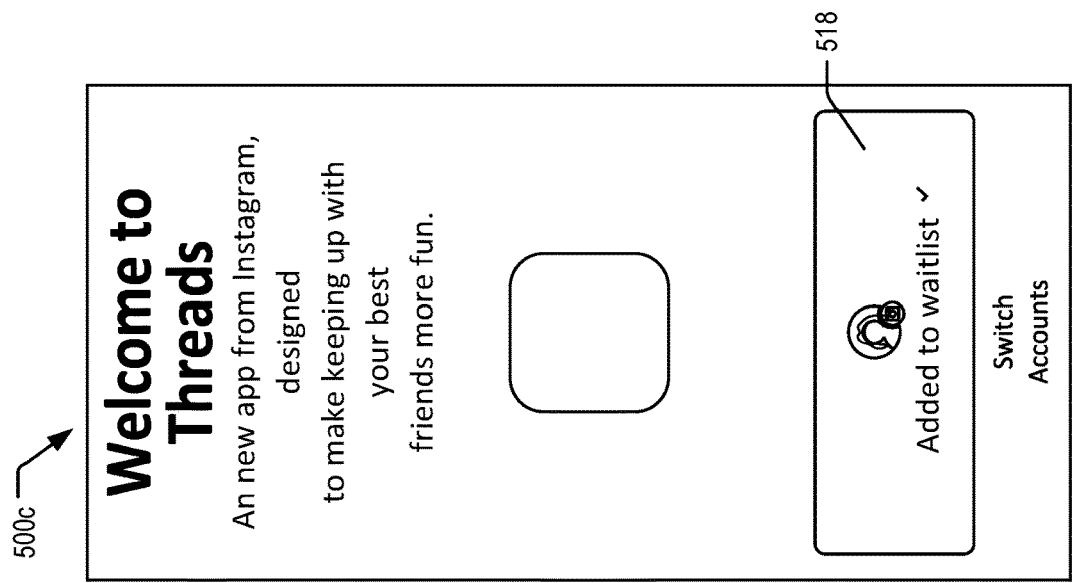
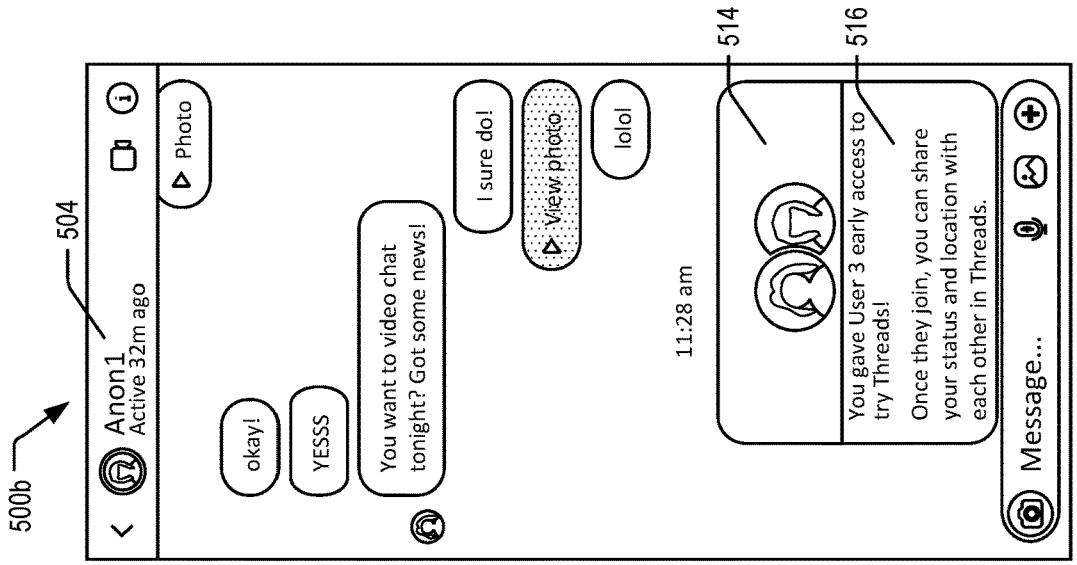
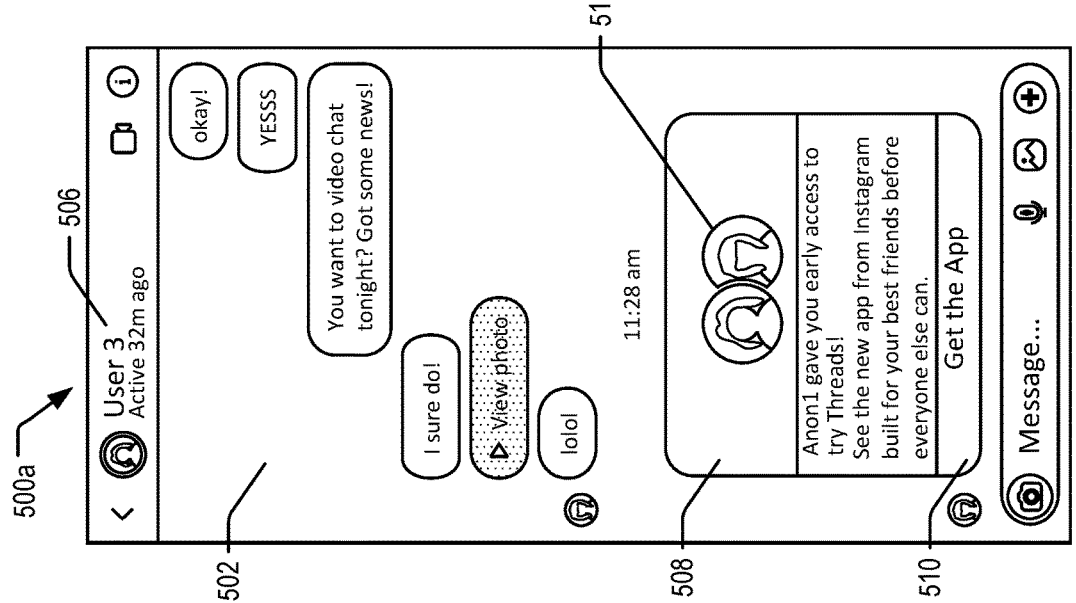

SOCIAL NETWORK ONBOARDING

BACKGROUND

With the proliferation of social network applications and/or services comes an increase need to determine the potential success of a new application and/or service and to create demand for a new application and/or service before a full rollout of the application and/or service is implemented. Many companies perform software testing (e.g., beta testing) on products prior to a full rollout of the product in order to assess potential product success and to generate interest in the product. However, in cases of a social network application and/or service that is used for communicating between users, determining which users to provide the product to for beta testing may be difficult. For instance, if other users who the user often communicates with do not have a social network application installed on their user device, and the user is unable to contact them via the social network application, then the user may have a poor experience using the social network application. This may lead to a user providing negative feedback and/or prematurely uninstalling the social network application from a user device before a full rollout of the social network application may be implemented. Thus, controlling which users may have access to a beta version of a social network application and/or service may present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 2A and 2B illustrate example interfaces usable to present a selectable message to a user enabling access to a service.

FIGS. 3A-3C illustrate example interfaces usable to present onboarding processes for a service.

FIGS. 4A and 4B illustrate example interfaces usable to present a number of contacts selectable to participate in a service.

FIGS. 5A-5C illustrate example interfaces usable to present a conversation between users including selectable messages.

DETAILED DESCRIPTION

Figure 1:
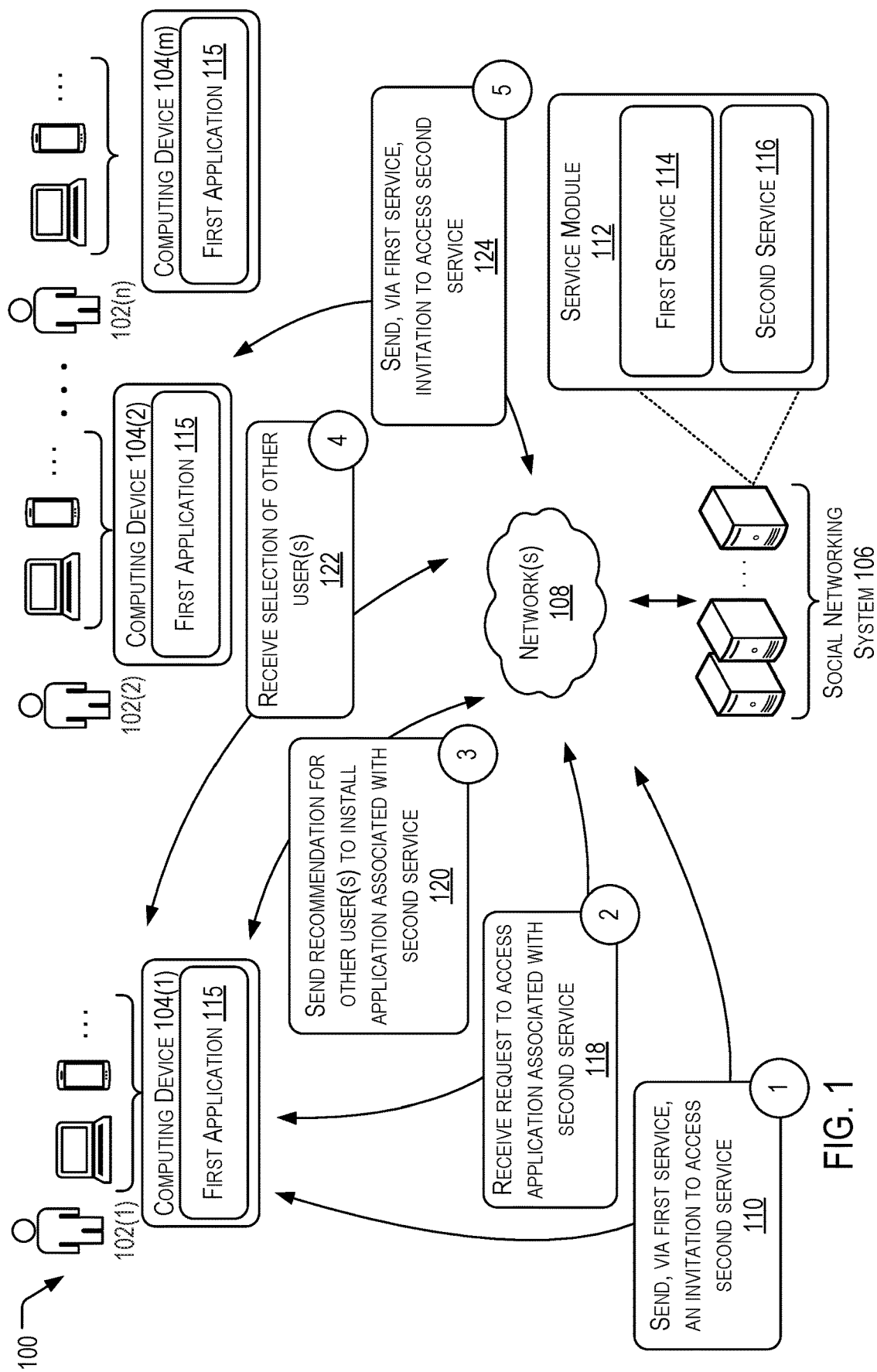
FIG. 1 is a schematic view of an example system usable to implement example techniques described herein.

As discussed above, controlling which users have access to a version of a social network application and/or service during software testing, such as beta testing, may present challenges. For instance, many social network applications and/or services (referred to herein as "social network applications") focus on communication between one or more users (e.g., direct messaging between users). For instance, if other users who the user often communicates with do not have a social network application installed on their user device, and the user is unable to contact them via the social network application, then the user may have a poor experience using the social network application. This may lead to a user providing negative feedback and/or prematurely uninstalling the social network application from a user device before a full rollout of the social network application may be implemented. Further, this may lead to a user prematurely uninstalling the social network application from a user device before a full rollout of the social network application may be implemented. The feedback received from the users (e.g., reviews, number of installs, number of uninstalls, etc.) may affect a decision by an entity operating the social network application regarding changes to make to the social network application. It is therefore paramount that the feedback received from users is accurate and reliable by controlling which users may have access to a beta version of a social network application.

Existing options for controlling which users may have access to a beta version of a social network application have been inadequate. For instance, previous techniques included selecting users within a single country to be eligible to participate in a beta version of a social network application. In such cases, when the social network application enabled communication between one or more users, communication with other users in another country that did not have access to the beta version of the social networking application thus were not eligible to participate in the beta version of the social network application. Consequently, previous techniques that restricted beta testing for social networking applications to a particular country would result in a negative experience for both the users included and the users excluded based on geographic location.

In another example, previous techniques included selecting a percentage of a population at random. However, when the social network application functionality being tested enables communication between one or more users, it may be necessary for multiple users to have the social network application installed on their user device. However, selecting a percentage of the population at random to participate cannot guarantee that a selected user will have contacts (e.g., friends) who the user communicates with also having access to the beta version of the social network application. Without having friends or contacts who the user knows to communicate with as part of a beta test, the user may have a negative experience with the social network application and/or may not use the social network application at all, which may cause the user to uninstall the social network application. This application describes techniques for determining which users to select to participate in a beta version (or other software testing) of a social network application, and controlling which users have access to the beta version of the social network as time moves forward.

For instance, in one example, a social networking system may operate multiple services that each correspond to a dedicated application installed on a user device. The social networking system may track and store user data, such as but not limited to, direct messaging behavior, visual message usage, and interaction history, associated with applications. The social networking system may utilize the user data to determine a user or users who may be viable participants in a beta version of a new service. In some cases, once an initial participant is determined, the social networking system may send a message to an inbox of an application installed on the user's device and associated with a user account of the user. The message may contain a selectable option for participating in the new service. For example, when the user opens the message, information (e.g., an advertisement) may be displayed on the user device providing information about the new service. In some cases, once the initial participant is determined, a token may be associated with the user account and/or user device of the user such that, when the user device attempts to install the application associated with the new service, the user account and/or the user device may be given permission to install the application associated with the new service due to the token. In some examples, once the application associated with the new service is installed on the user device, the application may present an interface that suggest contacts (e.g., friends) that the user may want to communicate with via the new service. In some cases, the social networking system may cause the application associated with the new service to present a list of contacts that are selectable to receive a message including an invitation to join the new service. Once the social networking system receives the selection, messages may be sent to the selected contacts containing an invitation to join the new service. In some cases, a token may be associated with a user account and/or user device of each of the selected contacts such that, when the user account and/or user device of the selected contacts attempts to install the application associated with the new service, the user account and/or user device is granted permission to do so. In some cases, the token may be included in the message. In some cases, the message to the selected contact may include a notification that they are on a waitlist to access the new service, and a token granting access to install the application may not be associated with their user account and/or user device.

In some examples, once the user device of the selected contact has installed the application associated with the new service, the social networking system may present another list of contacts that are selectable to receive a message including an invitation to join the new service. In some cases, the list presented to the selected contact may indicate only a certain number of contacts may be selected. In some cases, the number of people presented on the list may be less than a number of people that the user who received the initial participation message was permitted to select. In some cases, no list may be presented for inviting other users to join the new service.

In this way, the social networking system ensures that a user participating in a beta version of a social network application has other users (e.g., friends and/or contacts) selected by the user to communicate with via the social network application. Additionally, by limiting the number of selectable contacts that may receive a message containing the invitation to join the new service, the social networking system is able to precisely throttle the number of users participating in the new service.

Various embodiments of the present disclosure include systems, methods, and non-transitory computer-readable media of a social networking system. In some examples, a social networking system may send a first message to a first account associated with a first service, the first message including a first invitation to access a second service and the first account being associated with a first device. The social networking system may receive a request from the first account to install an application associated with the second service. The social networking system may receive an indication that the application is installed on the first device. The social networking system may determine that the first account has a token that enables access to the second service. The social networking system may determine a second account to recommend that the first account send a second invitation to join the second service. The social networking system may send an instruction to the first device associated with the first account to present identification information associated with the second account. The social networking system may receive a selection of the second account to send the second invitation to join the second service. The social networking system may send, in response to receiving the selection of the second account, a second message to the second account, the second message including the second invitation to access the second service and the second account being associated with a second device.

In some examples, the second invitation to join the second service is sent to a direct message inbox of the second account associated with the first service.

In some examples, the second invitation is selectable to install the second service on the second device.

In some examples, sending the second invitation causes the second account to have a second token that authorizes the second account access to the second service.

In some examples, in response to determining that the second account had access to the second service prior to sending the second message, the social networking system sending an instruction to the first device to present an indication that the second account has access to the second service.

In some examples, the token is stored at the computing system and is associated with the first account or the token is stored at the first device associated with the first account.

In some examples, the second account is one of multiple accounts, and the operations further comprise ranking the multiple accounts based at least in part on previous interaction of the first account with the multiple accounts, and sending an instruction to the first device to display the multiple accounts according to the ranking.

In some examples, the social networking system may receive a selection of at least the second account in which a user associated with the first account intends to communicate with via the second service and wherein determining the second account to recommend that the first account send an invitation to join the second service is based on receiving the selection.

In some examples, the social networking system may send a first message to a first account associated with a first service, the first message including a first invitation to access a second service. The social networking system may receive a request from the first account to install an application associated with the second service. The social networking system may receive an indication that the application is installed. The social networking system may determine that the first account has a token that enables access to the second service. The social networking system may receive a selection of a second account to send a second invitation to join the second service. The social networking system may send, in response to receiving the selection of the second account, a second message to the second account, the second message including the second invitation to access the second service.

In some examples, the second invitation to join the second service is sent to a direct message inbox of the second account associated with the first service and the second invitation is selectable to install the second service on a device associated with the second account.

In some examples, the social networking system may determine to send the first message to the first account based at least in part on at least one of direct messaging behavior of the first account, visual message usage of the first account, an account status of the first account, a likelihood that the first account will access the second service after a threshold period of time, or at least one a previous interaction with a previous invitation.

In some examples, the second invitation causes the second account to have a second token that enables access to the second service.

In some examples, the social networking system may determine a first number of accounts to recommend to a first user associated with the first account to send an invitation to join the second service; and determine a second number of accounts to recommend to a second user associated with the second account to send an invitation to join the second service, the second number of accounts being less than the first number of accounts.

In some examples, the second number of accounts is zero.

In some examples, the second invitation is selectable to install the second service on a device associated with the second account.

In some examples, the token comprises a first token and sending the second invitation causes the second account to have a second token that authorizes the second account access to the second service.

In some examples, the first token indicates that the first account may access the second service and may invite one or more other accounts to join the second service; and the second token indicates that the second account may access the second service and may not invite one or more other accounts to join the second service.

In some examples, the second account is one of multiple accounts, and the actions further comprise ranking the multiple accounts based at least in part on previous interaction of the first account with the multiple accounts, and sending an instruction to a device associated with the first account to display the multiple accounts according to the ranking.

In addition to the societal improvements discussed above, the techniques described herein also improve performance of one or more computing devices by reducing an amount of content sent over a network. For instance, by only sending messages to participate in a beta version of a social network application to users who are determined to be likely to participate in the beta version and/or are contacts of those users, the social network system can reduce the number of messages sent that may result in users never opening the message or not participating. In this way, the quantity of data sent over the network may be reduced.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to control a number of users participating in a beta version of a social network application via the system 100. In some examples, the system 100 may include users 102(1), 102(2), . . . 102(n) (collectively "users 102") to interact using computing devices 104(1), 104(2), . . . 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 a user account associated with the user. The user account may include demographic information, communication-channel information, and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to control which users 102 and how many users 102 have access to services provided by the social networking system 106.

For example, at operation 110 (indicated by "1"), a service module 112 of the social networking system 106 may send, via a first service 114 an invitation to access a second service 116 to a first user 102(1). In some examples, the first service 114 may be a first social network service (e.g., Instagram®, etc.), and the second service 116 may be a second social network service (e.g., Threads®, etc.), although other examples of services are also considered. The first service 114 and the second service 116 may be able to share information with one another to provide enhanced user experiences for the users 102, such as by updating message threads, streamlining notifications, suggesting users to connect with across the different services 114 and 116, and the like.

For example, a first computing device 104(1) that is associated with a first user 102(1) may store a first application 115 (e.g., a social networking application such as Instagram®) that is associated with the first service 114. The first application 115 may include an inbox that stores messages from other users 102(2), 102(n), businesses, the first service 114, the second service 116, and so forth.

The social networking system 106 may utilize the user data to determine users 102 who may be viable participants in a beta version (or other software testing) of the second service 116. In some examples, the social networking system 106 may determine that the first user 102(1) is a viable candidate to participate in a beta version of the second service 116. For example, the social networking system 106 may track and store user data associated with the users 102, such as but not limited to, direct messaging behavior, visual message usage, and interaction history associated with services (e.g., the first service 114) provided by the social networking system 106. In some examples, based on the user data, the social networking system 106 may determine a likelihood that the users 102 will use the second service 116. For example, in some cases, the first service 114 and the second service 116 may include communication features that allow the users 102 to communicate with one another. The social networking system 106 may analyze prior communications between the users 102 (e.g., direct messaging behavior, visual message usage, and interaction history) to determine a likelihood of the users 102 to use the second service 116 to communicate. In some cases, the social networking system 106 may analyze the users 102 prior history of participating in a beta version of another service, whether related to communication or otherwise, to determine if the users 102 are a viable participant for the beta version of the second service 116.

In some examples, the social networking system 106 may send a message to the inbox of the first application 115 that is stored on the first computing device 104(1), where the message may contain an invitation to access the second service 116. In some cases, the social networking system 106 may send the invitation to the inbox of the first application 115 installed on the first computing device 104(1) once the first user 102(1) is determined to be a viable candidate to participate in the beta version of the second service 116. In some cases, once the first user 102(1) is determined to be a viable candidate to participate in the beta version of the second service 116, a token may be associated with a first user account associated with the first user 102(1). In some examples, the token may be required for the first user account to access the second service 116. In some cases, the token may be stored at the social networking system 106 and be associated with the first user account associated with the first user 102(1). In some cases, the token may be included in the message sent to the inbox of the first application 115 installed on the first computing device 104(1), and the token may be stored on the first computing device 104(1) once the message is received in the inbox. In some cases, the social networking system 106 may remove (e.g., delete) the message from the inbox after a predetermined amount of time or after a threshold amount of time has elapsed without the first user 102(1) selecting and/or viewing the message. In some cases, even if the message has been removed, the token may still be associated with the first user account, such that the first user account may access the second service 116.

In some examples, at operation 118 (indicated by "2") the social networking system 106 may receive a request to access a second application associated with the second service 116. For example, the message sent to the inbox of the first application 115 may be selectable by the first user 102(1) such that, when the message is selected, an item of content (e.g., an advertisement, video, text, image, audio, combination of the above, and/or other form of content) may be displayed on the first computing device 104(1) which provides a description of the second service 116. In some examples, responsive to the first user 102(1) selecting the message to view, an option may be presented to install the second application onto the first computing device 104(1).

Consider an example in which the message, once selected, plays a video advertisement for the second service 116. Once the advertisement is finished playing, the first application 115 may redirect the first computing device 104(1) to an application store accessible by the first computing device 104(1) where the second application is available to be installed. In some examples, once the second application is installed on the first computing device 104(1), the social networking system 106 may receive a request from the first computing device 104(1) to access the second application associated with the second service 116.

In some examples, the social networking system 106 may determine that the first user account is associated with the token necessary to access the second application associated with the second service 116, thereby allowing the first user 102(1) to access the second application (e.g., to login, to interact with other users, etc.) via the first computing device 104(1). In some cases, during a login process of the second service 116, the second service 116 may pull information from the first service 114 associated with the first user account. For example, the second service 116 may pull photos, usernames, contact lists, etc., from the first service 114 to populate corresponding areas of the second service 116. In some examples, the second service 116 may automatically login the first user account of the first user 102(1) using the information pulled from the first service 114, thereby easing the login process for the first user 102(1). In other words, the first user 102(1) may access the second application associated with the second service 116 without inputting conventional account setup information such as an email address, name, address, phone number, username, password and the like, as the first user 102(1) has accessed the second application via the secure token received from the first service 114.

In some cases, if the first user 102(1) downloads the second application associated with the second service 116 and the first user 102(1) does not have a first account associated with the first service 114 and/or does not have a token associated with the first account, the first user 102(1) may receive a notification that the first account is denied access to the second service 116, and/or is on a waitlist to access the second service 116 (e.g., until the beta version stage of the second service is complete). In some cases, once the second application associated with the second service 116 is installed and the first user 102(1) is granted access, the second application may present an interface that suggests contacts (e.g., friends and/or the other users 102(2)-102(n)) that the first user 102(1) may want to communicate with via the second service 116.

In some examples, at operation 120 (indicated by "3"), the social networking system 106 may send a recommendation to the first user 102(1) for the other users 102(2)-102(n) to install the second application associated with the second service 116. For example, once the first user 102(1) has access to the second application associated with the second service 116, the social networking system 106 may determine other user accounts that are associated with the other users 102(2)-102(n) that may also be viable candidates for the beta version of the second service 116. In some cases, a second user 102(2) may be selected based on an affiliation between the second user 102(2) and the first user 102(1). In some cases, the affiliation may include communication data between the second user 102(2) and the first user 102(1) via the first service 114. The affiliation may include the first user 102(1) requesting that the second user 102(2) be a contact that the first user 102(1) wishes to communicate with via the second service 116. In some cases, the second user 102(2) may be determined based on user data associated with a second user account associated with the second user 102(2).

Once the second account associated with the second user 102(2) is determined, the social networking system 106 may send the recommendation for the second user 102(2) to install the second application associated with the second service 116 to the first computing device 104(1). In some cases, the recommendation may include multiple other users 102 determined to be viable candidates to participate in the beta version of the second service 116 and the recommendation may be in the form of a list. For example, the social networking system 106 may rank the users 102 based on a likelihood to participate with the second service 116. In some cases, the social networking system 106 may determine a likelihood to participate in the second service 116 based on an affiliation between the users 102(2)-102(n) and the first user 102(1) and/or user data associated with the users 102. In some examples, the recommendation may include an indication that at least one of the users 102 have already installed the second application associated with the second service 116. In some cases, the recommendation may cause the first device 104(1) to present identification information association with the second account of the second user 102(2) and/or any additional users 102(n) that the social networking system 106 recommends to invite to use the second service 116. In some cases, the recommendation may indicate that only a certain number of users 102 may be selected to receive access to the second service 116.

In some examples, at operation 122 (indicated by "4"), the social networking system 106 may receive a selection of the users 102(2)-102(n) that the first user 102(1) wishes to send an invitation to have access to the second service 116. For instance, the users 102(2)-102(n) may be selected by the user 102(1) from a user interface displayed by the computing device 104(1), e.g., from a list of recommended users.

In some examples, at operation 124 (indicated by "5"), the social networking system 106 may send a message containing an invitation to join the second service 116 to the users 102(2)-102(n) that were selected by the first user 102(1). For example, once the social networking system 106 receives an indication that the first user 102(1) has selected the second user 102(2) to participate in the second service 116, the social networking system 106 may send the message containing the invitation to the inbox of the first application 115 installed on the second computing device 104(2). In some cases, once the second user 102(2) is determined to be a viable candidate to participate in the beta version of the second service 116, a token may be associated with the second user account associated with the second user 102(2). The token may be required to access the second service 116, e.g., during the beta testing period. In some cases, the token may be stored at the social networking system 106 and be associated with the second user account associated with the second user 102(2). In some cases, the token may be included in the message sent to the inbox of the first application installed on the second computing device 104(2) and the token may be stored on the second computing device 104(2).

In some examples, once the second computing device 104(2) has installed the second application associated with the second service 116, the social networking system 106 may present contacts or other users on the second computing device 104(2) that are selectable by the second user 104(2) to receive an invitation to join the second service 116. In some cases, the second computing device 104(2) may present a list of other users 102(n) that contains only a certain number of contacts that may be selected to send an invitation to access the second service 116. In some cases, the number of people presented on second computing device 104(2) may be less than a number of people that the first user 102(1) who received the initial message was permitted to select. In some examples, the second computing device 104(2) may be prevented from displaying other users to invite to join the second service 116. Users may continue to be selected to be sent an invite to join the second service 116 until a threshold number of users are reached to complete the beta testing (e.g., 50 users, 100 users, 1,000 users, 1 million users, and so forth), or in some examples, no limit may be applied to the number of users that may be invited to join the second service 116.

In some examples, the social networking system 106 may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Example User Interfaces

FIG. 2A-5C are schematic views showing example user interfaces that are usable to implement the techniques described herein for controlling a number of users participating in a beta version (and/or other software testing) of a social network application. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system. As discussed above, the interfaces described in this section may, but need not, be implemented in the context of the system 100.

FIGS. 2A and 2B illustrate an example in which a first user, such as the first user 102(1), receives a message via a first service, such as the first service 114, containing an invitation to participate in a beta version of a second service, such as the second service 116. Interface 200a shown in FIG. 2A corresponds to an inbox 202 as it would appear on a computing device associated with a first account of the first user. In this example, the first user (anon1) has multiple messages in the inbox 202 including a message 204 including an invitation to participate in a beta version of the second service (e.g., Threads® Beta app). In some examples, the message 204 may be selectable by the first user, and in response to the first user selecting the message 204, content such as an advertisement for the second service may be displayed on the computing device. In some cases, the advertisement may be a video.

Interface 200b shown in FIG. 2B illustrates a notification 206 that may be presented in response to the first user selecting the message 204. In some cases, the notification 206 may be presented after the advertisement has played. The notification 206 may include a selectable option 208 to install the second application or a selectable option 210 to refrain from installing the second application. In some cases, the notification 206 may address the first user by a name (e.g., Anna) other than the username associate with the first account (e.g., anon1). For example, the first account may be associated with identifying information (e.g., legal name, alias name, address, email, phone number, financial information, etc.) that the notification 206 may include when providing an option to install the second application.

FIGS. 3A-3C illustrate an example in which a first user, such as the first user 102(1), logs into a beta version of a second service, such as the second service 116. Interface 300a shown in FIG. 3A illustrates a welcome page 302 associated with the second service. In some cases, during the login process of the second application associated with the second service, the second service may pull information from the first service. For example, the welcome page 302 may display an indication 304 that the second service is verifying the first account. In some examples, the second service may verify credentials associated with the first account, and/or populate portions of one or more user interfaces associated with the second service with content such as photos, usernames, contact lists, legal name, alias name, address, email, phone number, financial information, etc., with corresponding information and/or content retrieved from the first service.

Interface 300b shown in FIG. 3B illustrates a welcome page 306 after the second service has verified the credentials of the first user. The welcome page 306 may display a selectable option 308 to continue the login process. In some cases, the selectable option 308 may include identification information 310 that the second service pulled from the first service. For example, the second service may pull photos, usernames, contact lists, etc., from the first service and automatically login the first user using the information pulled from the first service, thereby streamlining the login process for the first user.

Interface 300c shown in FIG. 3C illustrates a selectable option 312 to create a group for starting a group chat with one or more other users. The interface 300C may present a number of contacts 314 that are selectable by the user to be invited to the group chat. In some cases, the second service may pull photos of the contacts from the first service and populate the interface 300c with the photos. In some cases, the second service may pull usernames or other identification information of the contacts and populate the interface 300c with selectable usernames or selectable identification information. In some cases, an indication 316 may indicate a number of contacts that may be selected (e.g., "5") and a number of contacts that have already been selected (e.g., "3").

FIGS. 4A and 4B illustrate an example in which a first user, such as the first user 102(1), confirms the contacts that the first user would like to include in a group chat associated with the second service, such as the second service 116, and selects contacts to receive an invitation to access the second service. Interface 400a shown in FIG. 4A, illustrates contacts 402 that the first user has selected to participate in the group chat associated with the second service. At interface 400a, the first user has the option to remove, using selectable options 404, any of the contacts 402 from the group chat associated with the second service.

Interface 400b shown in FIG. 4B illustrates an option to invite contacts of the first user to have access to the second service. For example, the interface 400b may include a list of contacts 406 that each have a selectable option 408 for indicating that the first user would like to send the contacts 406 an invitation to have access to the second service. In some cases, the contacts 406 may include identification information that the second service pulled from the first service. For example, the second service may pull photos, usernames, contact lists, etc., from the first service if the contacts 406 have an account associated with the first service. In some cases, the second service may present contacts that the first user previously indicated would like to participate in the second service via interface 300c and 400a. Once the first user has selected the contacts 406 using the selectable option 408, the first user may select the invite option 410 to send the invitation to the contacts 406.

FIGS. 5A-5C illustrate an example in which a first user, such as the first user 102(1), sends a message to a second user, such as the second user 102(2), containing an invitation to access a second service, such as the second service 116, via a first service, such as the first service 114. Interface 500a shown in FIG. 5A illustrates a conversation 502 between the first user 504 (anon1) and the second user 506 (User 3), from the perspective of the second user 506. In response to the first user 504 selecting the second user 506 to receive an invitation to have access to the second service, the social networking system may automatically send the second user a message 508, via a direct messaging feature of the first service, with a selectable option 510 to install the second application associated with the second service. In some cases, the message may include a photograph 512 or other identifying information associated with the first user and/or the second user. The photographs and the identifying information may be associated with a first account of the first user associated with the first service and/or a second account of the second user associated with the first service.

Interface 500b shown in FIG. 5B illustrates the conversation 502 between the first user 504 (anon1) and the second user 506 (User 3), from the perspective of the first user 504. The sent message 514 may include an indication 516 that the message has been sent.

Interface 500c shown in FIG. 5C corresponds to a situation in which a user may have installed the second application associated with the second service but may not have the proper credentials to access the second service. For example, interface 500c illustrates a notification 518 presented in response to determining that the second user has installed the second application associated with the second service but does not have the proper credentials to access (e.g., login) the second application. For example, the second user may not have the required token to access the second service and/or may not have a user account associated with the first service, which may be necessary to access the second service. The notification 518 may include an indication that the second user is on a waitlist to receive access to the second service. In some examples, the notification 518 may include a selectable option to request a follow up notification when the second user may access the second service.

Example Methods

Various methods are described with reference to the example system of FIG. 1 for convenience and ease of understanding. However, the methods described are not limited to being performed using the system of FIG. 1 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

Figure 6A:
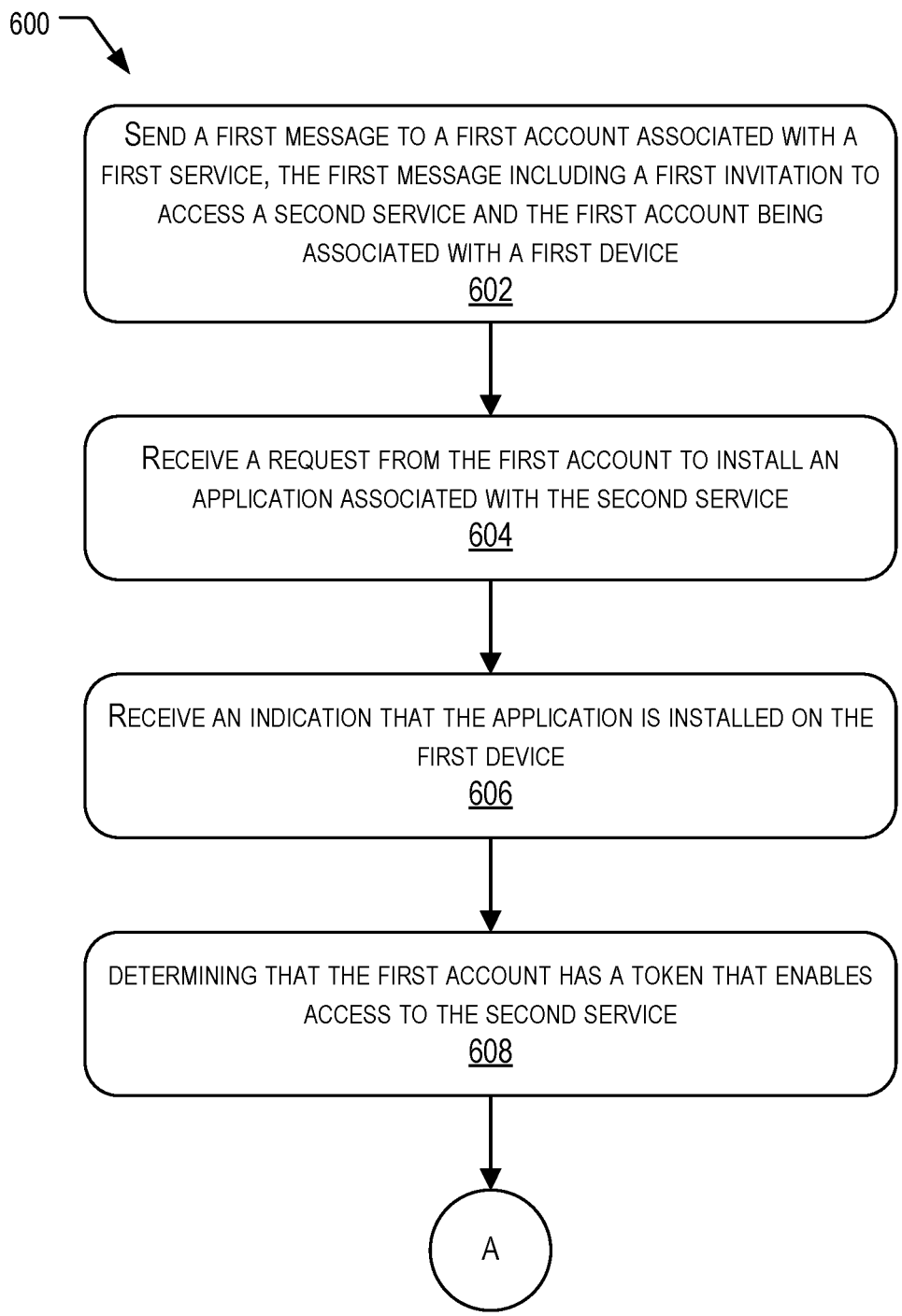
FIGS. 6A and 6B illustrate an example process for providing a user access to a first service via a second service.
Figure 6B:
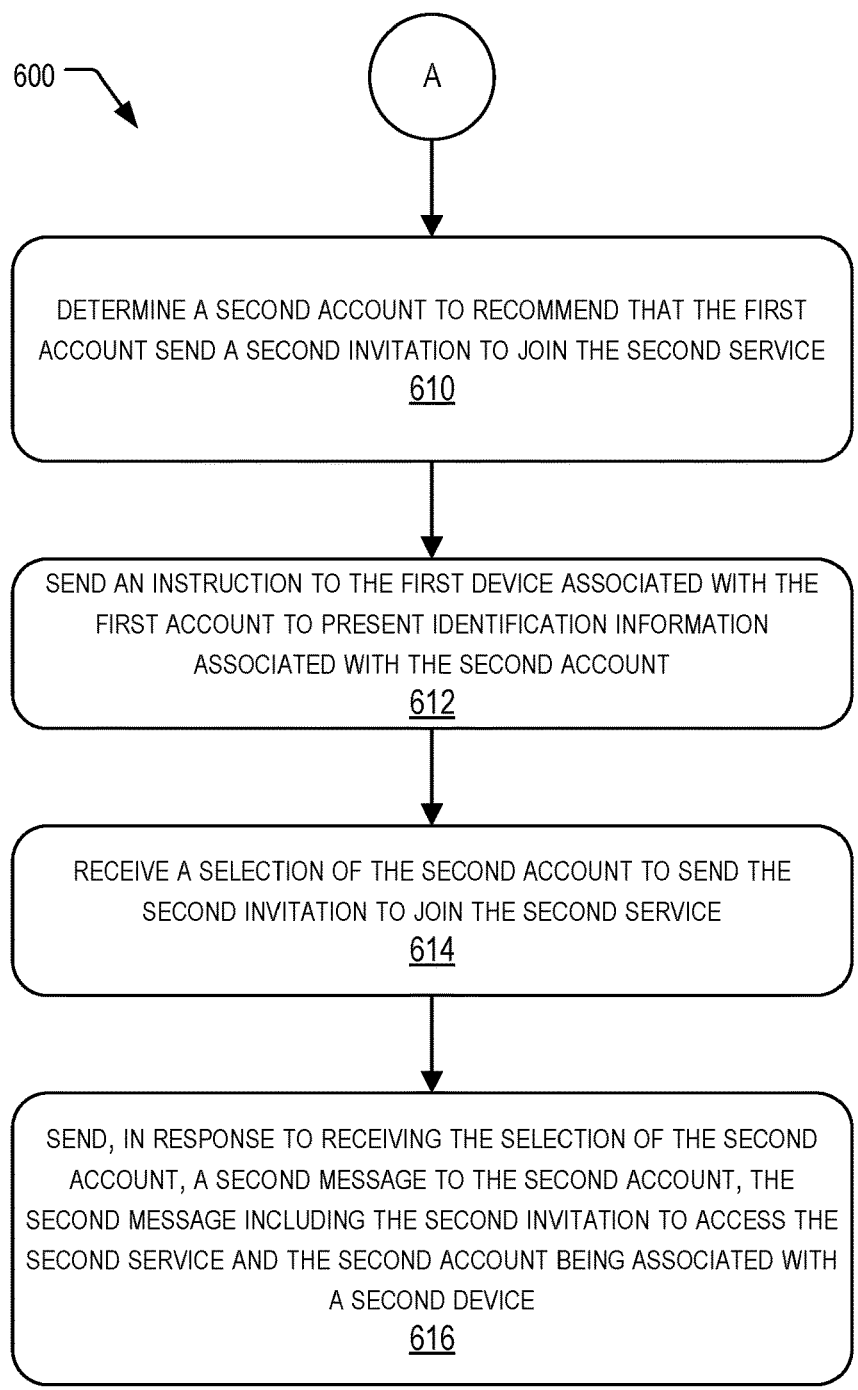

FIGS. 6A and 6B depict an example process 600 performed by a social networking service for sending a message, via a user account associated with a first service, that includes an invitation for a user to have access to a second service.

At operation 602, the process can include sending a first message to a first account associated with a first service, the first message including a first invitation to access a second service and the first account being associated with a first device. For instance, the service module 112 of the social networking system 106 may send, via the first service 114, an invitation to access the second service 116 to the first user 102(1). For example, the first computing device 104(1) that is associated with the first user 102(1) may store a first application 115 that is associated with the first service 114. The first application 115 may include an inbox that stores messages. In some examples, the social networking system 106 may send a message to the inbox of the first application 115 that is stored on the first computing device 104(1), and the message may contain the invitation to access the second service 116. In some examples, the social networking system 106 may determine that the first user 102(1) is a viable candidate to participate in a beta version (or other software testing) of the second service 116. For example, the social networking system 106 may track and store user data associated with the users 102, such as but not limited to, direct messaging behavior, visual message usage, and interaction history, associated with services (e.g., first service 114) provided by the social networking system 106. The social networking system 106 may utilize the user data to determine one or more of the users 102 who may be viable participants in a beta version of the second service 116. In some examples, based on the user data, the social networking system 106 may determine a likelihood that one or more of the users 102 will use the second service 116.

For example, in some cases, the first service 114 and the second service 116 may include communication features that allow the users 102 to communicate with one another. The social networking system 106 may analyze prior communications between the users 102 (e.g., direct messaging behavior, visual message usage, and interaction history) to determine a likelihood of the users 102 to use the second service 116 to communicate. In some cases, the social networking system 106 may analyze the users 102 prior history of participating in a beta version of another service, whether related to communication or otherwise, to determine if the users 102 are a viable participant for the beta version of the second service 116. In some cases, once the first user 102(1) is determined to be a viable candidate to participate in the beta version of the second service 116, the social networking system 106 may send the message containing the invitation to the inbox of the first application 115 installed on the first computing device 104(1).

In some cases, once the first user 102(1) is determined to be a viable candidate to participate in the beta version of the second service 116, a token may be associated with a first user account associated with the first user 102(1). The token may be required to access the second service 116. In some cases, the token may be stored at the social networking system 106 and be associated with the first user account associated with the first user 102(1). In some cases, the token may be included in the message sent to the inbox of the first application 115 installed on the first computing device 104(1), and the token may be stored on the first computing device 104(1). In some cases, the social networking system 106 may remove the message from the inbox after a predetermined amount of time or after a threshold amount of time has elapsed (e.g., one hour, one day, one week, two weeks, etc.) and the first user 102(1) has not selected or otherwise viewed the message. In some cases, even if the message has been removed, the token may still be associated with the first user account.

At operation 604, the process can include receiving a request from the first account to install an application associated with the second service. In some cases, the social networking system 106 may receive a request to access a second application associated with the second service 116. For example, the message sent to the inbox of the first application 115 may be selectable by the first user 102(1) such that, when the message is selected, an advertisement or other content may be displayed on the first computing device 104(1) which provides a description of the second service 116. In some examples, the advertisement may be a playable video, which may include information about the second service 116. In some examples, responsive to the first user 102(1) selecting the message, an option may be presented to install the second application onto the first computing device 104(1). For example, once the advertisement is over, the first application may redirect the first computing device 104(1) to an application store accessible by the first computing device 104(1) where the second application is available to be installed.

At operation 606, the process can include receiving an indication that the application is installed on the first device. In some cases, the social networking system 106 may receive a notification from the first computing device 104(1) that the second application associated with the second service 116 has been installed.

At operation 608, the process can include determining that the first account has a token that enables access to the second service. In some cases, once the first user 102(1) is determined to be a viable candidate to participate in the beta version of the second service 116, the social networking system 106 may send the message containing the invitation to the inbox of the first application installed on the first computing device 104(1). In some cases, once the first user 102(1) is determined to be a viable candidate to participate in the beta version of the second service 116, a token may be associated with a first user account associated with the first user 102(1). The token may be required to access the second service 116. In some cases, the token may be stored at the social networking system 106 and be associated with the first user account associated with the first user 102(1). In some cases, the token may be included in the message sent to the inbox of the first application installed on the first computing device 104(1) and the token may be stored on the first computing device 104(1). In some examples, once the second application is installed, the social networking system 106 may receive the request to access the second application associated with the second service 116 and the social networking system 106 may determine that the first user account is associated with the token necessary to access the second application associated with the second service 116, thereby allowing the first user 102(1) to access the second application (e.g., login, interact with other users, etc.) via the first computing device 104(1).

The process 600 proceeds through "A" to FIG. 6B, where at operation 610 the process can include determining a second account to recommend to the first account to send a second invitation to join the second service. In some cases, once the first user 102(1) has access to the second application associated with the second service 116, the social networking system 106 may determine other user accounts that are associated with the users 102 that may also be viable candidates for the beta version of the second service 116. In some cases, a second user 102(2) may be selected based on an affiliation between the second user 102(2) and the first user 102(1). In some cases, the affiliation may be based on communication data between the second user 102(2) and the first user 102(1) via the first service 114 (e.g. messages, tagging, "likes" of each other's shared content, etc.). In some cases, the affiliation may include the first user 102(1) requesting that the second user 102(2) be a contact that the first user 102(1) wishes to communicate with via the second service 116. In some cases, the second user 102(2) may be determined based on user data associated with a second user account associated with the second user 102(2).

At operation 612, the process can include sending an instruction to the first device associated with the first account to present identification information associated with the second account. In some cases, once the second account associated with the second user 102(2) is determined, the social networking system 106 may send the recommendation for the second user 102(2) to install the second application associated with the second service 116. In some cases, the recommendation may include multiple other users 102 determined to be viable candidates to participate in the beta version of the second service 116. In some examples, the computing device 104(1) may present the recommendation(s) in the form of a list. In some cases, the recommendation may include an indication that at least one of the users 102(2)-102(n) have already installed the second application associated with the second service 116. In some cases, the recommendation may cause the first device 104(1) to present identification information association with the second account of the second user 102(2). In some cases, the recommendation may indicate that only a certain number of users 102 may be selected to receive access to the second service 116.

At operation 614 the process can include receiving a selection of the second account to send the second invitation to join the second service. In some cases, the social networking system 106 may receive a selection of the users 102(2)-102(n) that the first user 102(1) wishes to send an invitation to have access to the second service 116.

At operation 616 the process can include sending, in response to receiving the selection of the second account, a second message to the second account, the second message including the second invitation to access the second service and the second account being associated with a second device. In some cases, once the social networking system 106 receives an indication that the first user 102(1) has selected the second user 102(2) to participate in the second service 116, the social networking system 106 may send the message containing the invitation to the inbox of the first application 115 installed on the second computing device 104(2). In some cases, once the second user 102(2) is determined to be a viable candidate to participate in the beta version of the second service 116, a token may be associated with the second user account associated with the second user 102(2). The token may be required to access the second service 116. In some cases, the token may be stored at the social networking system 106 and be associated with the second user account associated with the second user 102(2). In some cases, the token may be included in the message sent to the inbox of the first application 115 installed on the second computing device 104(2) and the token may be stored on the second computing device 104(2).

Figure 7:
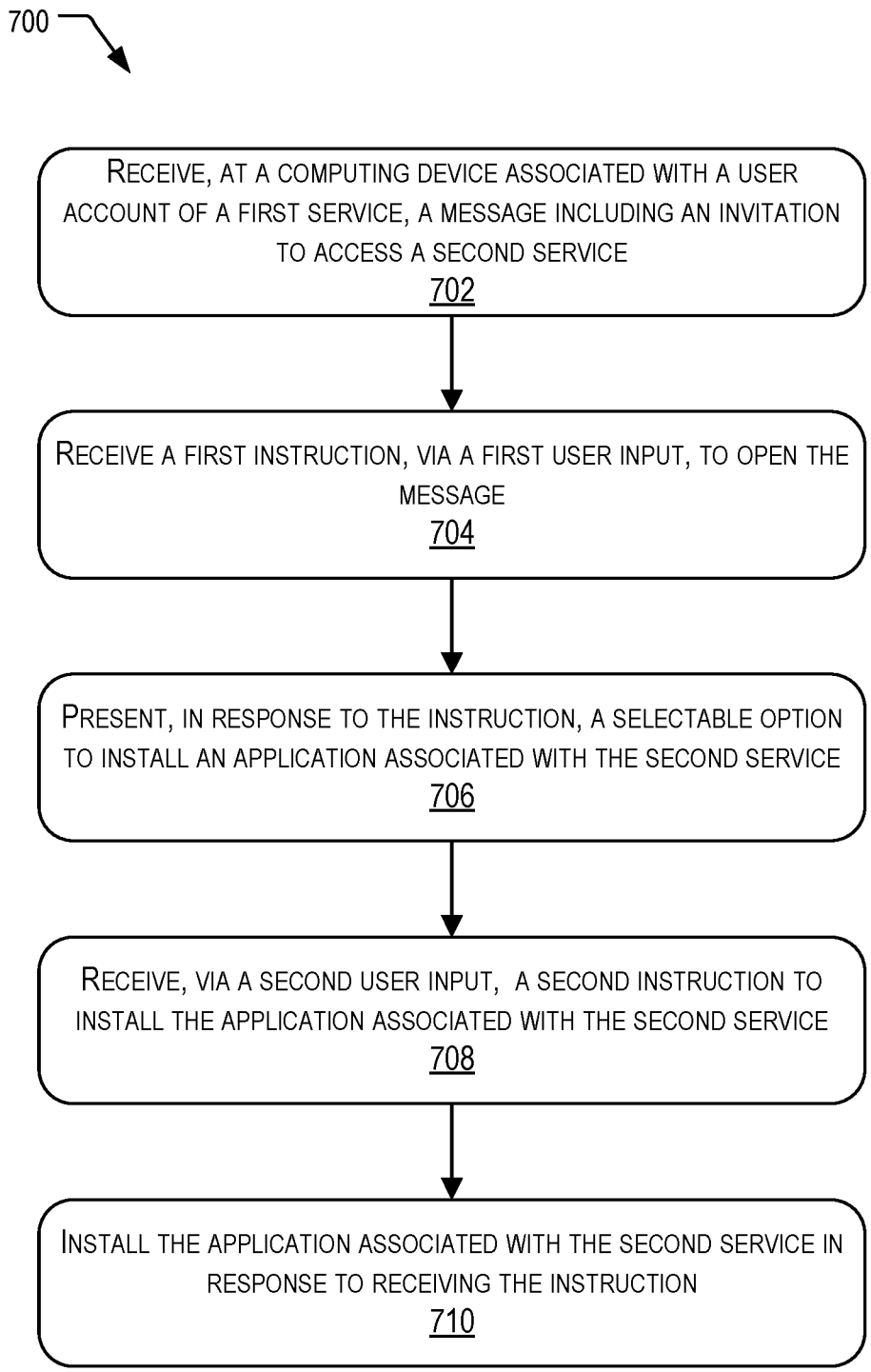
FIG. 7 illustrates an example process for receiving a selectable message enabling access to a service.

FIG. 7 depicts an example process 700 performed by a computing device for receiving a message, via a user account associated with a first service, inviting a user to have access to a second service.

At operation 702, the process can include receiving, at a computing device associated with a user account of a first service, a message including an invitation to access a second service. In some cases, the first computing device 104(1) that is associated with the first user 102(1) may store the first application 115 that is associated with the first service 114. The first application 115 may include an inbox that stores messages. In some examples, the social networking system 106 may send a message to the inbox of the first application 115 that is stored on the first computing device 104(1) and the message may contain the invitation to access the second service 116.

At operation 704, the process can include receiving a first instruction, via a first user input, to open the message. In some cases, the message sent to the inbox of the first application 115 may be selectable by the first user 102(1) such that, when the message is selected, an advertisement or other content may be displayed on the first computing device 104(1) which provides a description of the second service 116. In some examples, the advertisement may be a playable video.

At operation 706, the process can include presenting, in response to the instruction, a selectable option to install an application associated with the second service. In some cases, responsive to the first user 102(1) selecting the message, an option may be presented to install the second application onto the first computing device 104(1). For example, once the advertisement is over, the first application may redirect the first computing device 104(1) to an application store accessible by the first computing device 104(1) where the second application is available to be installed.

At operation 708, the process can include receiving, via a second user input, a second instruction to install the application associated with the second service. In some cases, the notification 206 may include a selectable option 208 to install the second application or a selectable option 210 to refrain from installing the second application. In some cases, the notification 206 may address the first user by a name (e.g., Anna) other than the username associate with the first account (e.g., anon1).

At operation 710, the process can include installing the application associated with the second service in response to receiving the instruction. In some cases, the computing device may install the application in response to the user selecting the selectable option 208 to install the second application.

Example System and Device

Figure 8:
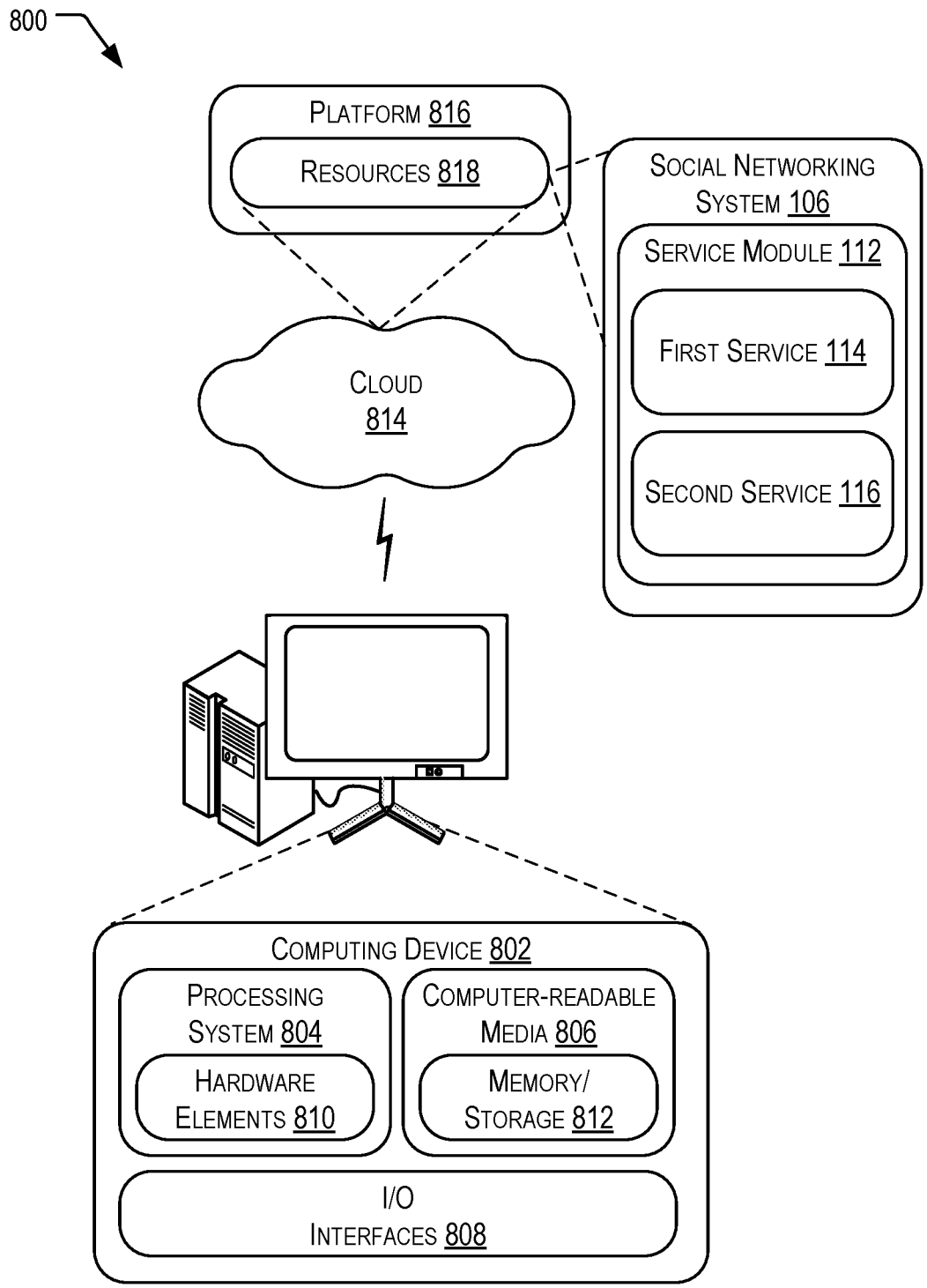
FIG. 8 illustrates an example system and device which may be used to implement the techniques described herein.

FIG. 8 illustrates an example system generally at 800 that includes an example computing device 802 that is representative of one or more computing systems and/or devices that may implement the various techniques described herein. This is illustrated through inclusion of the social networking system 106 configured to control a number of users participating in a beta version (or other software testing) of a service. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 802. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 802, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 810 and computer-readable media 806 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also be scalable to provide a corresponding level of scale to encountered demand for the resources 818 that are implemented via the platform 816. Accordingly, in an interconnected device embodiment, implementation of functionality described herein may be distributed throughout multiple devices of the system 800. For example, the functionality may be implemented in part on the computing device 802 as well as via the platform 816 which may represent a cloud computing environment 814.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system comprising:
one or more processors; and
memory storing one or more computer-executable instructions that are executable by the one or more processors to perform operations comprising:
sending a first message to a first account associated with a first user, the first account associated with a first service, the first message including a first invitation to access a second service and the first account being associated with a first device, wherein the first service is associated with the second service;
receiving a request from the first account to install an application associated with the second service;
receiving an indication that the application is installed on the first device;
determining that the first account has a token that enables access to the second service;
determining a second account associated with a second user different than the first user to recommend that the first account send a second invitation to join the second service based at least in part on the second account being a contact of the first account;
sending an instruction to the first device associated with the first account to present identification information associated with the second account;
receiving a selection of the second account to send the second invitation to join the second service; and
sending, in response to receiving the selection of the second account, a second message to the second account, the second message including the second invitation to access the second service and the second account being associated with a second device.

2. The computing system of claim 1, wherein the second invitation to join the second service is sent to a direct message inbox of the second account associated with the first service.

3. The computing system of claim 1, wherein the second invitation is selectable to install the second service on the second device.

4. The computing system of claim 1, wherein sending the second invitation causes the second account to have a second token that authorizes the second account access to the second service.

5. The computing system of claim 1, further comprising in response to determining that the second account had access to the second service prior to sending the second message, sending an instruction to the first device to present an indication that the second account has access to the second service.

6. The computing system of claim 1, wherein the token is stored at the computing system and is associated with the first account or the token is stored at the first device associated with the first account.

7. The computing system of claim 1, wherein the second account is one of multiple accounts, the operations further comprising:
ranking the multiple accounts based at least in part on previous interaction of the first account with the multiple accounts; and
sending an instruction to the first device to display the multiple accounts according to the ranking.

8. The computing system of claim 1, further comprising receiving a selection of at least the second account in which the first user associated with the first account intends to communicate with via the second service and wherein determining the second account to recommend that the first account send an invitation to join the second service is based on receiving the selection.

9. The computing system of claim 1, wherein the first service and the second service are both social network services, and both the first service and the second service are configured to transmit messages from the first device of the first user to the second device of the second user.

10. A method performed by a computing system, the method comprising:
sending a first message to a first account associated with a first user, the first account associated with a first service, the first message including a first invitation to access a second service;
receiving a request from the first account to install an application associated with the second service;
receiving an indication that the application is installed;
determining that the first account has a token that enables access to the second service;

receiving a selection of a second account associated with a second user to send a second invitation to join the second service, wherein the second user is different than the first user; and sending, in response to receiving the selection of the second account, a second message to the second account, the second message including the second invitation to access the second service.

11. The method of claim 10, wherein the second invitation to join the second service is sent to a direct message inbox of the second account associated with the first service and the second invitation is selectable to install the second service on a device associated with the second account.

12. The method of claim 10, further comprising determining to send the first message to the first account based at least in part on at least one of direct messaging behavior of the first account, visual message usage of the first account, an account status of the first account, a likelihood that the first account will access the second service after a threshold period of time, or at least one a previous interaction with a previous invitation.

13. The method of claim 10, wherein the second invitation causes the second account to have a second token that enables access to the second service.

14. The method of claim 13, further comprising:
determining a first number of accounts to recommend to the first user associated with the first account to send an invitation to join the second service; and
determining a second number of accounts to recommend to the second user associated with the second account to send an invitation to join the second service, the second number of accounts being less than the first number of accounts.

15. The method of claim 10, wherein the second account is one of multiple accounts, the method further comprising:
ranking the multiple accounts based at least in part on a likelihood of participation with the second service, and
sending an instruction to the first device to display the multiple accounts according to the ranking.

16. The method of claim 10, wherein receiving a selection of a second account is based at least in part on an affiliation between the first user and the second user.

17. One or more non-transitory computer-readable media storing instructions configured for execution by one or more processors of a computing system to perform actions comprising:

sending a first message to a first account associated with a first user, the first account associated with a first service, the first message including a first invitation to access a second service;

receiving a request from the first account to install an application associated with the second service;

receiving an indication that the application is installed;

determining that the first account has a token that enables access to the second service;

receiving a selection of a second account associated with a second user to send a second invitation to join the second service, wherein the second user is different than the first user; and sending, in response to receiving the selection of the second account, a second message to the second account, the second message including the second invitation to access the second service.

18. The one or more non-transitory computer-readable media of claim 17, wherein the second invitation is selectable to install the second service on a device associated with the second account.

19. The one or more non-transitory computer-readable media of claim 17, wherein the token comprises a first token and sending the second invitation causes the second account to have a second token that authorizes the second account access to the second service.

20. The one or more non-transitory computer-readable media of claim 19 wherein:
the first token indicates that the first account may access the second service and may invite one or more other accounts to join the second service; and
the second token indicates that the second account may access the second service and may not invite one or more other accounts to join the second service.

* * * * *